United States Patent [19]

Neaves

[11] Patent Number: 4,698,890
[45] Date of Patent: Oct. 13, 1987

[54] METHOD FOR MAKING A FORMABLE AND CURVE SHAPE RETENTIVE HOSE

[75] Inventor: Larry E. Neaves, Jefferson, N.C.

[73] Assignee: The Gates Rubber Company, Denver, Colo.

[21] Appl. No.: 7,023

[22] Filed: Jan. 27, 1987

Related U.S. Application Data

[62] Division of Ser. No. 793,074, Oct. 31, 1985, Pat. No. 4,669,508.

[51] Int. Cl.⁴ .............................................. B23P 17/00
[52] U.S. Cl. ........................................ 29/412; 29/450; 29/469.5; 156/143; 156/144; 156/244.13; 156/293; 264/506; 264/508
[58] Field of Search ...................... 29/417, 469.5, 412; 156/143, 144, 244.12, 244.13, 293; 138/103, 121, 122, 111, 112, DIG. 8; 264/506, 507, 508, DIG. 52; 174/47

[56] References Cited

U.S. PATENT DOCUMENTS

| | | |
|---|---|---|
| 314,440 | 3/1885 | Eames . |
| 646,887 | 4/1900 | Stowe et al. ............................ 174/47 |
| 2,704,556 | 3/1955 | Blish ............... 138/DIG. 8 |
| 2,713,885 | 7/1955 | McKinley ............................ 156/143 |
| 2,715,914 | 5/1958 | Roberts ........................... 156/144 X |
| 2,998,028 | 7/1958 | Rohde . |
| 3,076,737 | 2/1963 | Roberts ............................. 156/144 |
| 3,194,705 | 7/1965 | Caplan ............................ 156/196 X |
| 3,315,703 | 4/1967 | Matthews et al. ................... 138/111 |
| 3,784,785 | 1/1974 | Noland .............................. 174/47 X |
| 3,859,408 | 1/1975 | Voss et al. . |
| 4,098,298 | 7/1978 | Vohrer .................................. 138/122 |
| 4,295,496 | 10/1981 | Bixby .................................... 138/122 |
| 4,307,754 | 12/1981 | Muratsubaki ........................ 138/121 |
| 4,327,775 | 5/1982 | Tally .................................... 138/122 |
| 4,371,415 | 2/1983 | Tanaka ........................ 156/244.13 X |
| 4,374,530 | 2/1983 | Walling ............................... 138/121 |
| 4,399,319 | 8/1983 | Zinn .................................... 174/47 |
| 4,456,034 | 6/1984 | Bixby ................................... 138/122 |
| 4,463,779 | 8/1984 | Wink et al. ................... 138/DIG. 8 |
| 4,517,404 | 5/1985 | Hughes et al. ....................... 138/111 |
| 4,620,569 | 11/1986 | von Glanstatten et al. ......... 138/121 |

FOREIGN PATENT DOCUMENTS

| | | |
|---|---|---|
| 2518989 | 4/1975 | Fed. Rep. of Germany ...... 174/213 |
| 2629032 | 12/1978 | Fed. Rep. of Germany ...... 174/213 |
| 5299790 | 8/1979 | Japan . |
| 809112 | 5/1955 | United Kingdom ................. 174/47 |
| 1361215 | 7/1974 | United Kingdom ............... 154/143 |

Primary Examiner—Howard N. Goldberg
Assistant Examiner—Andrew E. Rawlins
Attorney, Agent, or Firm—H. W. Oberg, Jr.; C. H. Castleman, Jr.; F. P. Grassler

[57] ABSTRACT

A reformable, shape retentive hose having a precured tube located in a hose sidewall, and a reformable rod inserted in the precured tube. A method for making hose by placing at least one precured tube in the sidewall of a hose during the time that the hose sidewall is formed, curing the hose assembly with the precured tube in the sidewall, and inserting a reformable rod in a portion of the precured tube.

13 Claims, 12 Drawing Figures

METHOD FOR MAKING A FORMABLE AND CURVE SHAPE RETENTIVE HOSE

This is a division of application Ser. No. 793,074, filed Oct. 31, 1985, now U.S. Pat. No. 4,669,508 issued June 2, 1987.

BACKGROUND OF THE INVENTION

The invention relates to flexible polymeric hose of the elastomeric rubber or plastic type, but more particularly, the invention relates to flexible hose with means that facilitate bending and retaining the hose in a desired contour. The invention also relates to a method for making such hose without the need for extensive process or equipment changes.

Radiator hose is used extensively in automobiles for ducting a cooling fluid between an engine block and radiator. Some radiator hoses are molded with several compound curves to avoid interference with engine compartment components, such as V-belts, alternators, air pumps, brackets, or the like.

While curved or preformed hose solves routing and manufacturing assembly problems for an original equipment manufacturer, it creates inventory problems for an aftermarket hose distributor who finds it economically unfeasible to attempt to stock the required number of curved hose pieces for fitting all applications. Corrugated hose has become a poplular replacement for curved hose to the small hose distributor because he can carry a small corrugated hose inventory that is suitable as a substitute for a variety of differently configured curved hoses. For example, one length of corrugated hose may be an effective substitute replacement for ten or more different curved hose configurations.

Corrugated hose has two sleeve or "cuff" ends that are interconnected by an intermediate corrugated sidewall that permits folding and inhibits kinking. An example of an early corrugated hose design appears in U.S. Pat. No. 314,440 to Eames. The Eames type hose is made on a mandrel and the corrugations are formed by helically wrapping a cord or rope around the hose to act as a mold for the corrugations.

Another type of hose is made by "pressure molding", which is achieved by internally pressurizing a hose and radially expanding it against a mold cavity of a desired configuration. An example of a corrugated hose made in such a manner is disclosed in U.S. Pat. No. 3,194,705 to Caplan. The Caplan hose also discloses an embodiment where a helical coil is embedded in the hose sidewall at either the corrugation's crests or valleys as a collapse resistance means when the hose is bent. Another type of hose that is radially expanded by pressure against the walls of a mold appears in U.S. Pat. No. 3,859,408 to Voss et al. Under the Voss et al method, a collapse resistance means may be inserted in the bore of the hose.

Although corrugated hose is an acceptable substitute for many curved hose applications, it has not been a "cure all" substitute for all curved hosed applications. Corrugated hose tends to take a symmetrical curved hose shape as its ends are positioned in parallel and/or angular misalignment from each other. For example, a hose may be shaped to a "S" bend, but both loops of the "S" tend to have the same bend radius. Many curved hose applications require unsymmetrical "S" bends to avoid interference with engine components. Various hose inserts have been developed for corrugated hose to solve the "S" bend problem. Examples of such corrugated hose with shape retentive inserts disposed in the hose bore appear in U.S. Pat. No. 4,327,775 to Tally and U.S. Pat. No. 4,456,034 to Bixby. While such hoses with internal inserts solve the hose "S" bend problem, they may introduce other problems in some hose applications. One problem is that the internal insert by design, defines an obstruction in the hose bore. Another problem is that the internal insert, being not fixably attached to the hose bore, may move during use and thereby permit an especially long hose to slump into an undesirable shape.

There are some hoses with reformable inserts in their sidewalls which avoid the obstruction problem as well as the slumping problem; however, such hoses have relatively small diameters and are made by extrusion processes that are not applicable to a corrugated sidewall construction or a pressure molding process. An example of a small diameter hose for use as automotive heater hose, which has a longitudinally oriented reinforcement in its sidewall appears in U.S. Pat. No. 4,463,779 to Wink et al. A hose with several longitudinally oriented elements disposed in its sidewall appears in U.S. Pat. No. 2,998,028 to Rohde. The Rohde construction cannot be used to make hose formed by the pressure molding process such as taught by Caplan or a cording process such as taught by Eames because under each of these process, pressure is applied to the hose sidewall during the curing. Pressure on the sidewall would collapse and seal the longitudinal wire receiving cavity during curing. The Wink et al hose construction is also inapplicable for making a hose with a corrugated sidewall. A longitudinal cavity formed in the hose sidewall would be collapsed and sealed as the sidewall is pressurized to take a corrugated shape. A wire coextruded with the Wink et al hose would prevent or substantially inhibit a sidewall to be formed into a corrugated shape under either the Caplan or Eames methods of forming a hose sidewall.

SUMMARY OF THE INVENTION

In accordance with the invention, a formable, shape retentive hose is provided that may have either a cylindrical, or more preferably, a corrugated sidewall. Shape retentiveness is provided by a longitudinally oriented, reformable rod that is disposed in an elastomeric tube located in the sidewall of the hose.

Under the method of the invention, a precured tube is placed in the sidewall of an uncured hose after which the hose sidewall is pressurized and cured. A reformable rod is then inserted into the unsealed, precured tube.

An advantage of the invention is that a shape retentive, corrugated hose may be made by a hose molding process without any mold changes for locating a reformable rod in the hose sidewall.

This and other advantages or objects of the invention will be apparent after reviewing the drawings and description thereof, wherein.

DESCRIPTION OF PREFERRED EMBODIMENTS

Article

Figure 1:
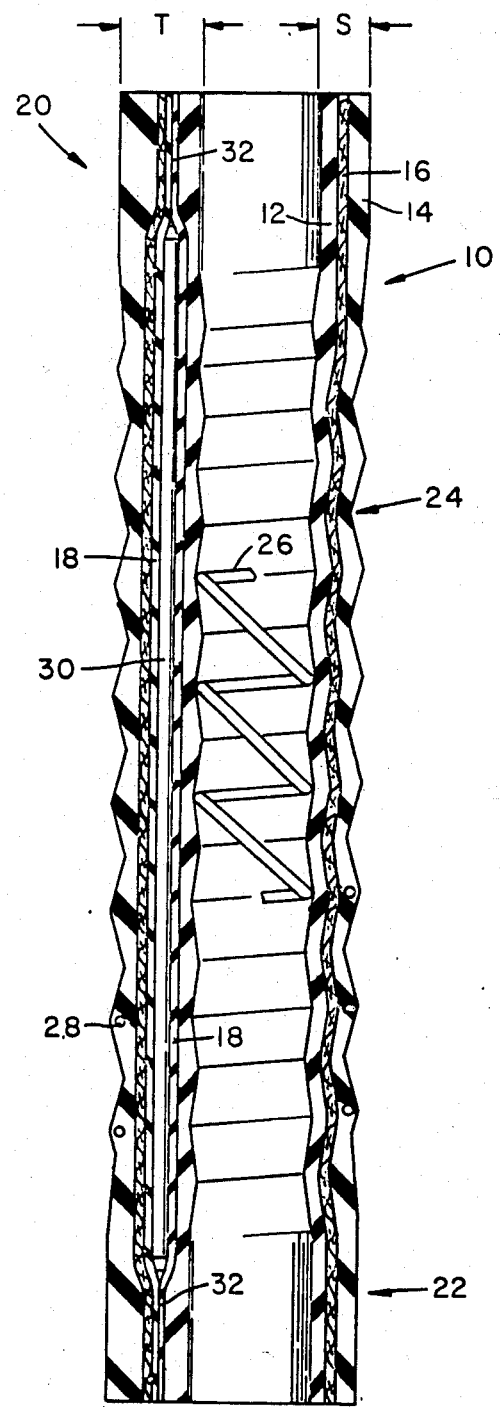
FIG. 1 is a view in partial cross-section along the longitudinal axis of a helically corrugated type hose with a reformable rod located in a hose sidewall.
Figure 2:
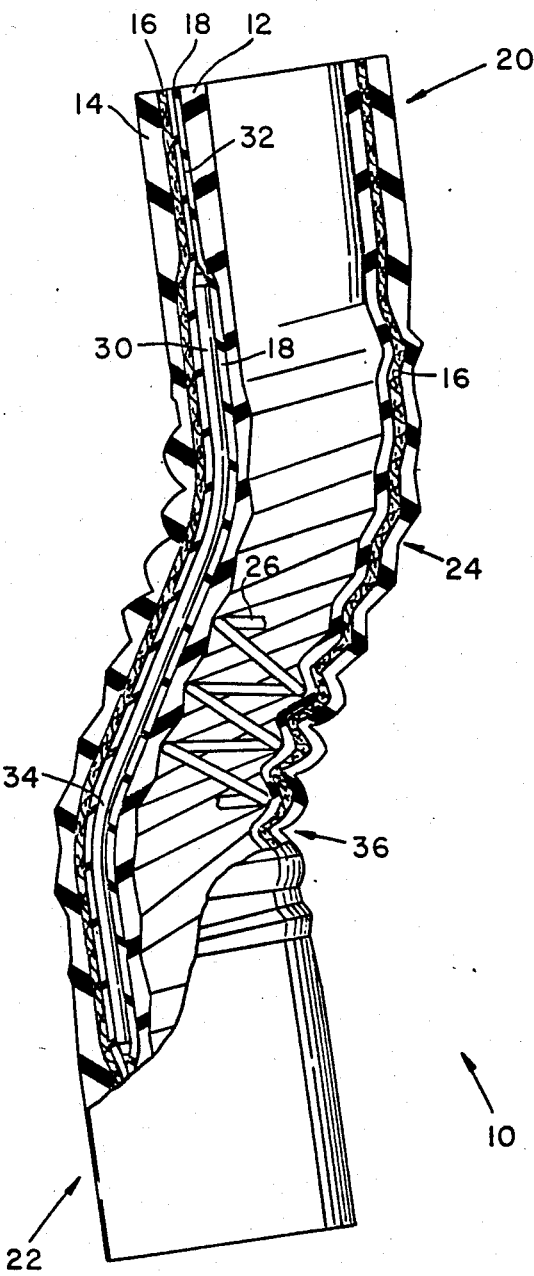
FIG. 2 is a partially cutaway view along the longitudinal axis of a corrugated hose like that illustrated in FIG. 1 but showing the hose and its reformable rod in a shape retentive, curved position.

Primarily referring to FIGS. 1 and 2, a hose of the invention has a tube 12, a cover 14, and a reinforcement 16 that together characterize a sidewall S of the hose. The tube and cover may be made from any suitable elastomer, which may be of the thermosetting or thermoplastic type such as plastic, polyurethane, thermoplastic rubber, thermosetting rubber or blends thereof or the like that are cured into a desired configuration with an application of heat. In the case of thermoplastics, a heating followed by a cooling is required to retain a desired shape, whereas, in the case of thermosetting elastomers, only heating is required. The reinforcement 16 may also be of any suitable type, such as a twined reinforcement in the form of a knit, braid, spiral, fabric discontinuous fibers or the like, and may be made of any suitable material, such as natural or synthetic fibers.

At least one precured elastomeric tube is located in the sidewall S, and is longitudinally oriented with the hose. The precured tube may be extruded and of any suitable thermosetting or thermoplastic elastomeric material, such as those listed above for the tube and cover. Should a thermoplastic material be selected for the precured tube, its melt temperature must be greater than the cure temperature for the hose tube 12 or cover 14, whether they be of thermosetting or thermoplastic materials. A thermosetting tube is cured in its extruded shape. That portion of the sidewall containing the precured tube 18 may be of a greater thickness T than other portions of the hose sidewall.

For a hose of the corrugated type, the hose sidewall is formed into cuff ends 20, 22 and an intermediate corrugated sidewall 24 that may be in the form of a helix or successive annular peaks and valleys. The cuff ends permit clamping and sealing against a nipple, such as a radiator boss. While the corrugated sidewall permits folding and stretching when the hose is vent, a helical spring 26 is preferably located in the bore of the hose as a means for inhibiting kinking when the hose is bent. Optionally, a helical spring 28 may be located in the hose sidewall for the same purpose.

A reformable rod 30, such as made of wire, is disposed in the precured tube preferably in the corrugated wall portion intermediate the cuff ends. The reformable rod may spread or straighten that portion of the precured tube and the corrugated sidewall portion and leave the precured tube partially flattened 32 in the cuff portions. It is preferred that the reformable rod does not extend into that portion of a cuff end that will be clamped, because if there, it could prevent making an effective seal between the hose and a nipple as the hose is clamped.

When the hose is bent, the reformable rod may move slightly in the tube as it also bends 34 to retain the hose in a curved configuration 36.

Figure 3:
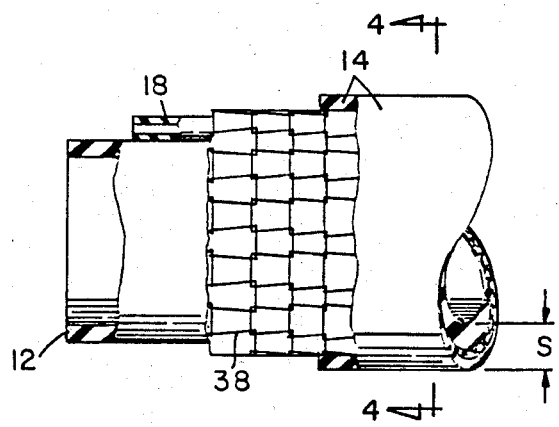
FIG. 3 is a partially cutaway side view exposing construction features of a hose of the invention.
Figure 4:
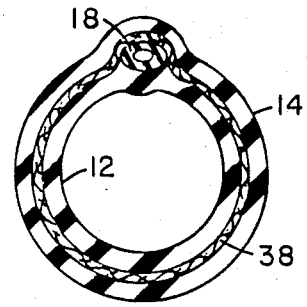
FIG. 4 is a cross-sectional view taken along the line 4—4 of FIG. 3.

Referring to FIGS. 3-8, the precured tube 18 may be located at various positions within the hose sidewall. For ease of manufacturing, a most preferred location is illustrated by FIGS. 3 and 4 where the precured tube 18 is positioned against the hose tube 12 and a fibrous reinforcement 16, such as a knit 38, surrounds the precured tube and hose tube. The cover 14 is then formed over the fibrous reinforcement. The fibrous reinforcement not only reinforces the hose tube, but it also helps retain the precured tube 18 within the sidewall when the reformable rod is bent.

Figure 5:
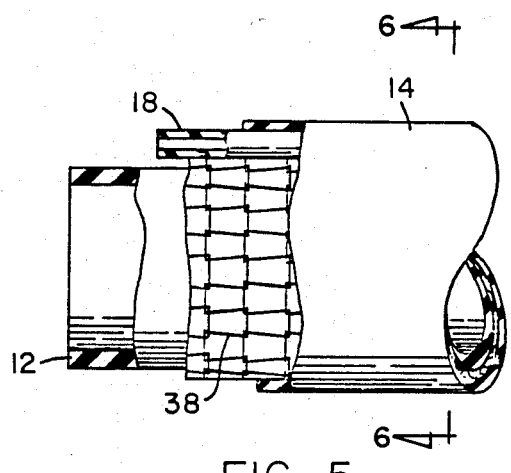
FIG. 5 is a view similar to FIG. 3, but showing alternate construction features of a hose of the invention.
Figure 6:
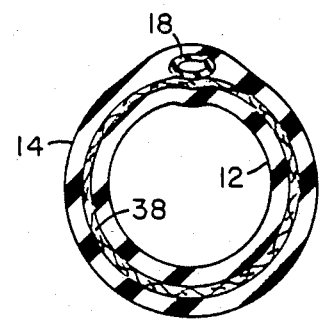
FIG. 6 is a cross-sectional view taken along the line 6—6 of FIG. 5.

As illustrated by FIGS. 5 and 6, the fibrous reinforcement knit 38 may surround the hose tube 12 so that the precured tube 18 is positioned over the fibrous reinforcement. A cover is formed and shaped around the precured tube and fibrous reinforcement. The tube and cover may be preformed in any acceptable manner such as by extruding or wrapping.

Figure 7:
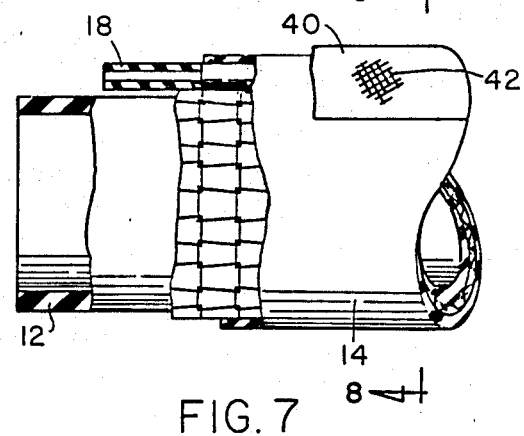
FIG. 7 is a view similar to FIG. 3, but showing alternate construction features of a hose of the invention.
Figure 8:
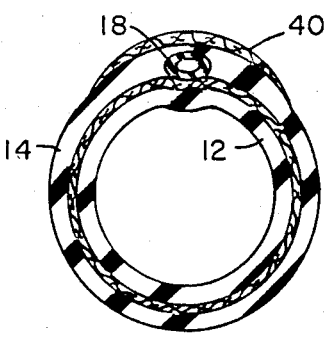
FIG. 8 is a cross-sectional view taken along the line 8—8 of FIG. 7.

FIGS. 7 and 8 illustrate a construction similar to that of FIGS. 5 and 6, except that a strip 40 of fibrous reinforcement, such as rubberized bias woven fabric 42 is positioned over the precured tube to act as a reinforcement to hold the precured tube and reformable wire to the hose when it is bent.

Method

Figure 9:
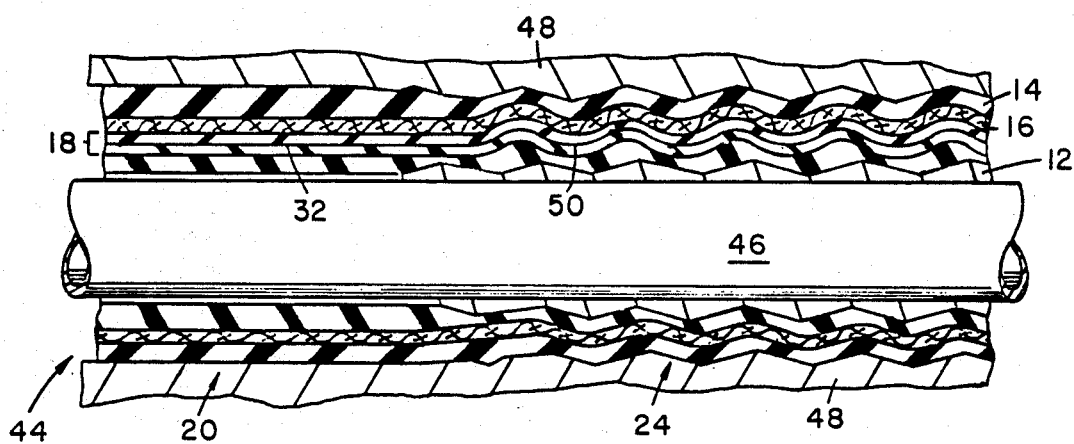
FIG. 9 is a partial cross-sectional view of hose having construction features as illustrated by FIG. 3 and as located in a corrugated mold.

A primary advantage of the invention is reflected by a method which does not require extensive changes to hose making equipment. Referring to FIG. 9, an uncured hose 44 with a precured tube 18 located in its sidewall, and having the construction illustrated by FIG. 3 and 4, is positioned over a loose fitting support mandrel 46 and placed into a mold 48 with a cavity shaped for a corrugated hose, such as that taught by Caplan. The bore of the hose is pressurized, which positions the hose against the mold while shaping it to form cuff ends 20 and a corrugated sidewall 24. In the case of rubber being used for the precured tube, hose and cover, heat is applied for the requisite time, and the hose is cured. The precured tube may be partially flattened 32 and kinked 50 in the corrugated hose sidewall during the time that the hose sidewall is pressurized and formed against the mold. While the precured tube may partially flatten during the time that the hose is pressure molded into a desired shape, the bore of the precured hose does not seal against itself becaust is has been precured. Note that the mold and mandrel do not require any special machining to accommodate the thicker sidewall portion containing the precured tube. Accordingly, known and unmodified hose molding equipment is used.

Figure 10:
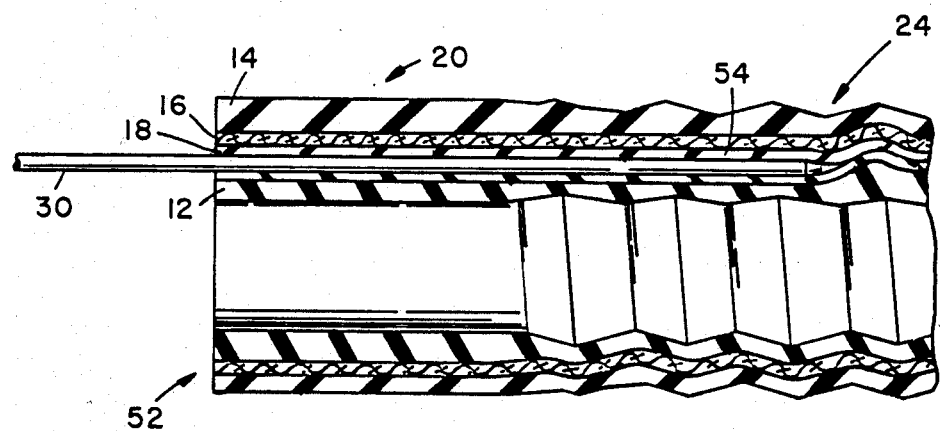
FIG. 10 is a cross-sectional view of the hose as illustrated in FIG. 9, and showing the placement of a reformable rod in the hose sidewall.

Several pieces of hose may be cured in "end to end" fashion as is known in the art. After curing, the hoses are cut 52 to their appropriate length. As illustrated by FIG. 10, a reformable rod 30 is then inserted into the precured tube 18, which partially spreads and straightens that portion 54 of the precured tube where the rod is located.

Figure 11:
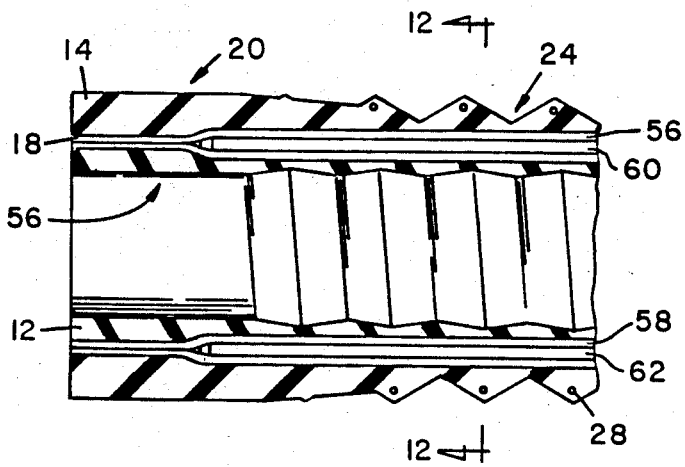
FIG. 11 is a cross-sectional view of a hose similar to that as illustrated by FIG. 10, but showing an alternate construction feature of the invention.
Figure 12:
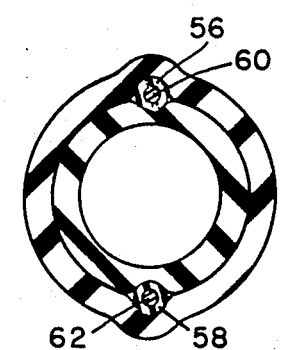
FIG. 12 is a cross-sectional view taken along the line 12—12 of FIG. 11.

As shown in FIG. 11, the reformable rod 18 is positioned in the sidewall juxtaposed the corrugated wall portions, leaving that portion 56 of the precured tube in the cuff ends free of the reformable rod. Two or more precured tubes 56,58 with a reformable rods 60,62 disposed therein may be required for large diameter hose (i.e., 2 inches in diameter or greater).

The foregoing detailed description is made for the purpose of illustration only and is not intended to limit the scope of the invention, which is to be determined from the appended claims.

What is claimed is:

1. In a method for making elastomeric hose by the steps of forming a curable hose subassembly with a tube having a bore, reinforcement and cover that together characterize a sidewall of the hose; placing the hose subassembly in a mold; pressurizing the bore and expanding the hose subassembly against the mold and forming the hose subassembly to a desired exterior shape; and curing the so formed hose subassembly into a cured hose; the improvement comprising the steps of:
    placing at least one precured tube in the side wall during the step of forming the hose subassembly so that the tube is longitudinally oriented with the hose subassembly;
    curing the hose subassembly and embedding the precured tube in the hose sidewall; and
    inserting a reformable rod in at least one precured tube and defining a formable hose with curved shape retentive characteristics.

2. The method for making hose as claimed in claim 1 and further including the steps of forming and curing the sidewall with corrugations between spaced apart cuff ends and inserting a shortened reformable rod into the precured tube so that a longitudinal portion of each cuff end is without the reformable rod.

3. The method for making hose as claimed in claim 1, and further including the step of forming the hose subassembly with a sidewall that successively comprises a tube, reinforcement and cover while placing the precured tube between the tube and reinforcement of the hose subassembly.

4. The method for making hose as claimed in claim 1 and further including the step of forming the hose subassembly with a sidewall that successively comprises a tube, reinforcement and cover of the hose subassembly.

5. The method for making hose as claimed in claim 1 and further including the step of forming the hose subassembly with a sidewall that successively comprises a tube, reinforcement, cover and strip of fibrous reinforcement longitudinally oriented with hose subassembly and placing the precured tube between the cover and strip of fibrous reinforcement of the hose subassembly.

6. The method for making hose as claimed in claim 1 and further including the steps of forming the hose subassembly to an elongate length equivalent to at least two desired cured hose lengths; placing the precured hose in the sidewall throughout the elongate length of the hose subassembly; and cutting the cured hose and embedded precured tube to the desired cured hose lengths.

7. The method for making hose as claimed in claim 1 and further including the step of inserting a helical wire in the bore of the cured hose as a kink resistant means.

8. The method for making hose as claimed in claim 1 and further including the step of placing a helical wire in the sidewall of the hose subassembly to define a kink resistant means in the cured hose.

9. The method for making hose as claimed in claim 1 and further including the steps of:
    extruding a heat curable elastomeric tube;
    placing a precured tube longitudinally next to the elastomeric cover and twining a reinforcement around the elastomeric tube and precured tube and thereby holding the precured tube in its longitudinally oriented position;
    extruding a heat curable elastomeric cover over the reinforcement and around the precured tube and elastomeric tube to define the hose subassembly; and
    heating the hose subassembly to affect curing and define a cured hose.

10. The method for making hose as claimed in claim 9 and further including the steps of:
    extruding a heat curable, small diameter tube with a bore of sufficient size to receive the reformable rod; and
    heat curing the small diameter tube to a degree that the bore of the small diameter tube will not stick and seal against itself when the tube is collapsed and reheated and thereby define the precured tube.

11. The method for making hose as claimed in claim 9 and further including the step of:
    extruding the cover while simultaneously shaping a portion of the cover around a portion of the precured tube and embedding the precured tube in the sidewall of the hose subassembly.

12. The method for making hose as claimed in claim 1 and further including the steps of:
    partially flattening the precured tube during the steps of expanding and curing the hose subassembly; and
    inserting the reformable rod in the precured tube of the cured hose while simultaneously spreading that portion of the precured tube with and juxtaposed the reformable rod.

13. The method for making hose as claimed in claim 1 and further including the steps of:
    partially flattening the precured tube and partially corrugating the precured tube with the sidewall during the steps of expanding and curing the hose subassembly; and
    inserting the reformable rod in the precured tube of the cured hose while simultaneously spreading and partially straightening a portion of the corrugations of the precured tube juxtaposed the reformable rod while leaving those portions of the precured tube without the rod at the cuff, in a partially flattened condition.

* * * * *